United States Patent
Sim et al.

(10) Patent No.: US 9,363,854 B2
(45) Date of Patent: Jun. 7, 2016

(54) COOKING APPARATUS USING MICROWAVES

(75) Inventors: Sung Hun Sim, Seoul (KR); Jin Yul Hu, Seoul (KR); Hyun Wook Moon, Seoul (KR); Heung Sik Choi, Seoul (KR); Wan Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 857 days.

(21) Appl. No.: 13/266,543

(22) PCT Filed: Jun. 18, 2010

(86) PCT No.: PCT/KR2010/003982
§ 371 (c)(1),
(2), (4) Date: Feb. 9, 2012

(87) PCT Pub. No.: WO2010/147439
PCT Pub. Date: Dec. 23, 2010

(65) Prior Publication Data
US 2012/0125921 A1    May 24, 2012

(30) Foreign Application Priority Data

Jun. 19, 2009  (KR) .................. 10-2009-0055168
Jun. 19, 2009  (KR) .................. 10-2009-0055170
Sep. 1, 2009   (KR) .................. 10-2009-0082004

(51) Int. Cl.
*H05B 6/80*     (2006.01)
*H05B 6/78*     (2006.01)
*H01J 37/32*    (2006.01)
(Continued)

(52) U.S. Cl.
CPC ............... *H05B 6/686* (2013.01); *H05B 6/705* (2013.01); *Y02B 40/143* (2013.01); *Y02B 40/146* (2013.01)

(58) Field of Classification Search
CPC ...... H05B 6/686; H05B 6/705; Y02B 40/143; Y02B 40/146
USPC ......... 219/702, 709–712, 745, 690, 694–696, 219/687; 118/723 MW, 723 ME; 156/345
See application file for complete search history.

(56) References Cited

U.S. PATENT DOCUMENTS 6,080,270 A * 6/2000 Tabrez et al. ............. 156/345.36
6,316,759 B2 * 11/2001 Gaisford et al. ............... 219/748
(Continued)

FOREIGN PATENT DOCUMENTS

JP     04065095 A  *  3/1992
JP     2000-357583     12/2000
(Continued)

OTHER PUBLICATIONS

International Search Report issued in PCT/KR2010/003982 dated Feb. 10, 2011.
(Continued)

*Primary Examiner* — Quang Van
(74) *Attorney, Agent, or Firm* — KED & Associates LLP

(57) ABSTRACT

A cooking apparatus using microwaves may include a microwave generator that generates and outputs a plurality of microwaves to heat an object in a cavity, and a controller that calculates heating efficiency of each of the plurality of microwaves based on the microwaves reflected from the cavity, and then sets heating time of each of the microwaves during a heating period of time according to the calculated heating efficiency.

16 Claims, 15 Drawing Sheets

(51) Int. Cl.
*H05B 6/68* (2006.01)
*H05B 6/70* (2006.01)

(56) References Cited

U.S. PATENT DOCUMENTS

| | | | |
|---|---|---|---|
| 2008/0290087 A1 | 11/2008 | Ben-Shmuel et al. |
| 2009/0045191 A1 | 2/2009 | Ben-Shmuel et al. |
| 2009/0057302 A1 | 3/2009 | Ben-Shmuel et al. |

FOREIGN PATENT DOCUMENTS

| | | |
|---|---|---|
| JP | 2000-357583 A | 12/2000 |
| JP | 2007-317458 | 12/2007 |
| JP | 2008-269793 | 11/2008 |
| JP | 2008-269793 A | 11/2008 |
| WO | WO 2007/096878 | 8/2007 |
| WO | WO 2009/011111 | 1/2009 |
| WO | WO 2009/050893 | 4/2009 |

OTHER PUBLICATIONS

Korean Office Action issued in Application No. 10-2009-0055168 dated Aug. 24, 2015.
Korean Office Action issued in Application No. 10-2009-0055170 dated Aug. 26, 2015.
Korean Office Action issued in Application No. 10-2009-0082004 dated Aug. 26, 2015.

* cited by examiner

- AVERAGE TEMPERATURE=1
- STANDARD DEVIATION=0.713
- RELATIVE TEMPERATURE DISTRIBUTION : 0.126~3.178

- AVERAGE TEMPERATURE=1
- STANDARD DEVIATION= 0.617
- RELATIVE TEMPERATURE DISTRIBUTION : 0.07~2.9

- AVERAGE TEMPERATURE=1
- STANDARD DEVIATION=0.54
- RELATIVE TEMPERATURE DISTRIBUTION : 0.2~2.6

COOKING APPARATUS USING MICROWAVES

TECHNICAL FIELD

The present invention relates to a cooking apparatus using microwaves, and more particularly, to a cooking apparatus using microwaves for selecting microwaves used when heating.

BACKGROUND ART

In general, in a cooking apparatus using microwaves, after closing received foods, when pressing an operation button, a voltage is applied to a high voltage generator. In this case, a commercial voltage applied to the high voltage generator is boosted and the power is applied to a magnetron to generate microwaves, and the microwaves generated by the magnetron are transmitted to a cavity through a waveguide.

At this point, the cooking apparatus using microwaves heats food through frictional heat generated by vibrating the molecules composed of the food by two billions and five million times per second after irradiating the food with microwaves generated from the magnetron.

The cooking apparatus using microwaves is widespread in a home due to various advantages such as ease of the temperature control, cooking time savings, ease of operation and the like.

DISCLOSURE

Technical Problem

An object of the present invention is to provide a cooking apparatus using microwaves wherein an uniform power can be transmitted to an object inside a cavity by decreasing a heating time for microwaves having a high heating efficiency and increasing the heating time for microwaves having a low heating efficiency.

Meanwhile, another object of the present invention is to provide a cooking apparatus using microwaves wherein even when the microwaves of frequencies that a calculated heating efficiency during an initial scan is equal to or greater than a threshold value do not exist, the scan tine can be shortened by effectively selecting the microwaves of frequencies using when heating.

In addition, yet another object of the present invention is to provide a cooking apparatus using microwaves wherein the object inside the cavity can be uniformly heated by controlling such that the heating mode is selected according to the heating efficiency and the same energy is supplied by the selected heating mode.

Technical Solution

In order to solve the aforementioned problem, there is provided a cooking apparatus using microwaves according to an embodiment of the present invention, including: a microwave generator which generates a plurality of microwaves to heat an object inside a cavity and then outputs the generated microwaves; and a controller which calculates heating efficiency with respect to each of the plurality of microwaves based on the microwaves reflected from the inside of the cavity among the outputted microwaves, and then sets heating time with respect to each microwave during a heating period of time according to the calculated heating efficiency.

In addition, there is provided a cooking apparatus using microwaves according to an embodiment of the present invention, including: a microwave generator which generates a plurality of microwaves to heat an object inside a cavity and then outputs the generated microwaves; and a controller which uses microwaves when heating by selecting the microwaves of frequencies corresponding to the heating efficiency down adjusted by setting value from the maximum heating efficiency when the microwaves of frequencies that a heating efficiency is equal to or greater than a threshold value, based on the microwaves reflected from the inside of the cavity among the outputted microwaves, do not exist.

In addition, there is provided a cooking apparatus using microwaves according to an embodiment of the present invention, including: a microwave generator which generates a plurality of microwaves to heat an object inside a cavity and then outputs the generated microwaves; and a controller controls such that a heating mod is selected according to a heating efficiency calculated on the basis of the microwaves reflected from the inside of the cavity among the outputted microwaves, and the same energy is supplied by the selected heating mode.

Advantageous Effects

According to the cooking apparatus using microwaves of the present invention, the present invention has the following effects one or more.

Firstly, an uniform power can be transmitted to an object inside a cavity by decreasing a heating time for microwaves having a high heating efficiency and increasing the heating time for microwaves having a low heating efficiency. Further, the cost can be reduced by maintaining a constant power during a heating period of time using microwaves without including additional power control devices.

Secondly, even when the microwaves of frequencies that a calculated heating efficiency during an initial scan is equal to or greater than a threshold value do not exist, the scan tine can be shortened by effectively selecting the microwaves of frequencies using when heating.

Thirdly, the object inside the cavity can be uniformly heated by controlling such that the heating mode is selected according to the heating efficiency and the same energy is supplied by the selected heating mode.

The effects of the present invention are not limited to the above-mentioned effects and further effects not described above will be clearly understood by those skilled in the art.

BEST MODE

Exemplary embodiments of the present invention will now be described in detail with reference to the accompanying drawings.

In the following description, usage of suffixes such as 'module', 'part' or 'unit' used for referring to elements is given merely to facilitate explanation of the present invention, without having any significant meaning by itself. Thus, the 'module' and 'part' may be mixedly used.

Figure 1:
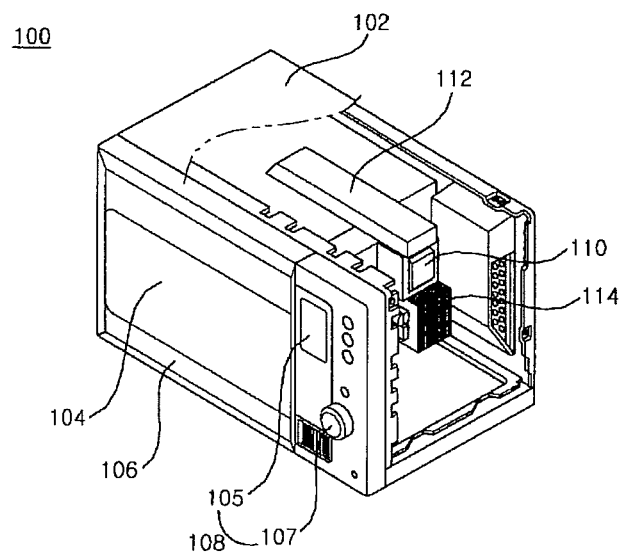
FIG. 1 is a partial perspective view illustrating a cooking apparatus using microwaves according to an embodiment of the present invention.
Figure 2:
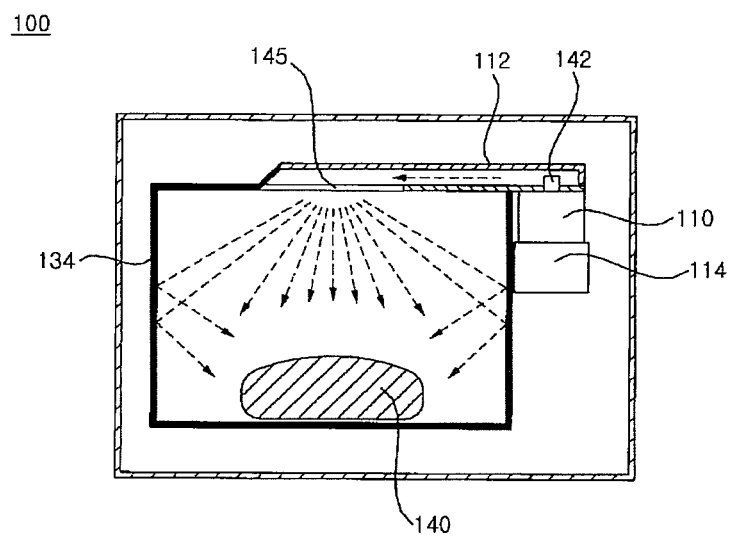
FIG. 2 is a cross-sectional view illustrating the cooking apparatus shown FIG. 1.

FIG. 1 is a partial perspective view illustrating a cooking apparatus using microwaves according to an embodiment of the present invention, and FIG. 2 is a cross-sectional view illustrating the cooking apparatus shown FIG. 1.

Referring to FIGS. 1 and 2, in the cooking apparatus 100 using microwaves according to the embodiment of the present invention, a door 106 on which a cooking window 104 is attached is coupled to the front portion of the main body 102 to be closed or opened and a operating panel 108 is coupled to one side portion of the front of the main body 102.

The door 106 closes and opens a cavity 134. Although not shown in drawings, the inside of the door 160 may be provided a filter (not shown) for shielding of the microwaves.

The operating panel 180 includes an operating unit 107 operating operations of the cooking apparatus and a display unit 105 displaying the operations of the cooking apparatus.

The inside of the main body 102 is provided with the cavity 134 having a receiving space of a predetermined size to cook a heating object 140, for example, foods by microwaves In addition, the outside surface of the cavity 134 is installed with a microwave generator 110 for generating microwaves and an output side of the microwave generator 110 is disposed with a microwave transmitter 112 for guiding microwaves generated from the microwave generator 110 to the inside of the cavity 134.

The microwave generator 110 may include a magnetron, or a solid state power amplifier (SSPA) using a semiconductor. The solid state power amplifier (SSPA) has an advantage of occupying less space than the magnetron.

Meanwhile, the solid state power amplifier (SSPA) can be implemented with a hybrid microwave integrated circuits (HMIC) including an additional passive elements (capacitors or inductors) or active elements (transistors) for amplification, or a monolithic microwave integrated circuits (MMIC) on which the passive elements and the active elements are implemented as one substrate.

Meanwhile, according to the embodiment of the present invention, the microwave generator 110 may generate and output a plurality of microwaves. The range of frequency of the microwave may be approximately 900 MHz to 2,500 Hz. In particular, the range of frequency of the microwave may be in a predetermined range around 915 MHz or around 2,450 MHz. The microwave generator 110 is described in detail with reference to FIG. 3 below.

The microwave transmitter 112 transmits microwaves outputted form the microwave generator 110 to the cavity 134. The microwave transmitter 112 may include a waveguide or a coaxial line. In order to transmit the generated microwaves to the microwave transmitter 112, a coupling unit 142 is connected as shown in the drawings.

Meanwhile, the microwave transmitter 112 may be implemented in the opened form having an opening 145 inside the cavity 134 as shown in the drawings, but it is not limited to thereof and an antenna can be coupled to the end. The opening 145 may be formed in various types such as a slot and the like. The microwaves are discharged to cavity 134 through the opening 145 or the antenna. Thus, the portion discharging the microwaves into the cavity 134 is called as a feeder and may include the opening or the antenna.

Meanwhile, in the drawings, only the opening 145 disposed on the upper side of cavity 134 is shown, but the opening 145 may be disposed on the lower or the side portion of the cavity 134 and a plurality of openings may be disposed. Further, it may be coupled through the antenna instead of the opening 145.

The lower side of the microwave generator 110 is provided with a power supply 114 which supplies power to the microwave generator 110

The power supply 114 may include a high voltage transformer which supplies a high voltage to the microwave generator 110 by boosting power inputted to the cooking apparatus 100, or an inverter which supplies approximately 3500V or more high output voltage generated by performing switching operations of at least one switching elements to the microwave generator 110.

Meanwhile, the vicinity of the microwave generator 110 may be installed with a cooling fan (not shown) which cools the microwave generator 110

Although not shown in the drawings, the inside of the cavity 134 is installed with a turntable (not shown) which rotates the heating object 140, or the inside of the cavity 134 is provided with a stirrer fan (not shown) which distributes the microwaves and a cover (not shown) which prevents damage of the stirrer fan (not shown). The stirrer fan (not shown) can mean a kind of antenna described above.

The cooking apparatus 100 using the microwaves as described above is operated when being pressed a cooking selection button (not shown) and a start button (not shown) by operating an operation panel 108, in particular, an operating unit 107 in a state that the door 106 is closed, after the user opens the door 106 and inserts the heating object 104 in the cavity 134.

That is, the power supply 114 of the cooking apparatus 100 boosts the inputted AC power to high voltage DC power and supplies the high voltage DC power to the microwave generator 110, the microwave generator 110 generates and outputs the corresponding microwaves, and the microwave transmitter 112 transmits and discharges the generated microwaves to the cavity 134. Accordingly, the heating object 140 for example, foods provided inside the cavity 134 is heated. The overall operation of the cooking apparatus 100 may be performed by a controller (not shown). The controller (not shown) is described with reference to the drawings below.

Figure 3:
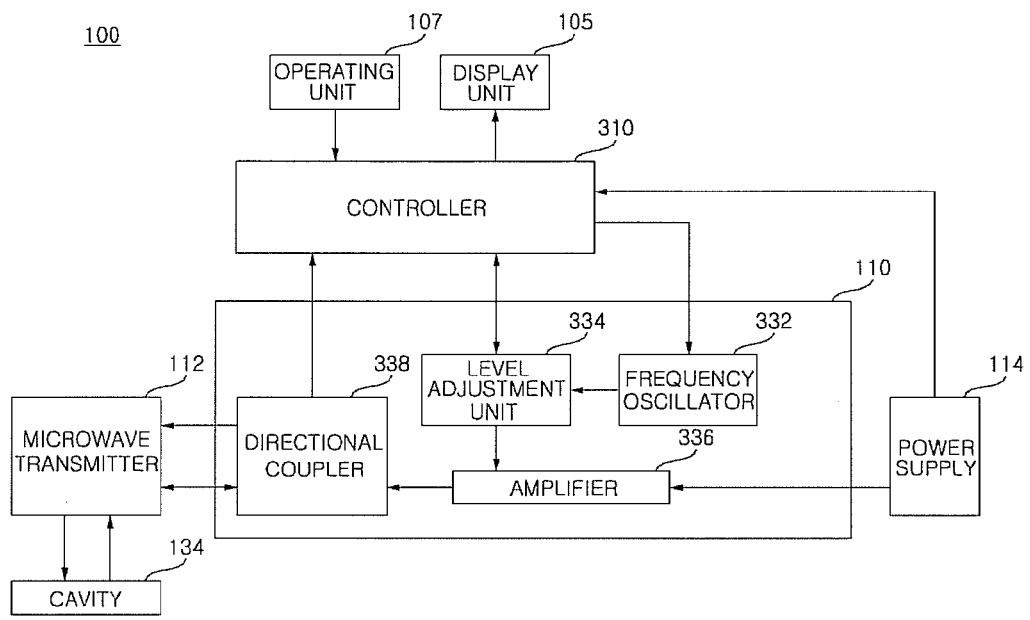
FIG. 3 is a block diagram illustrating the inside of the cooking apparatus shown FIG. 1.
Figure 4:
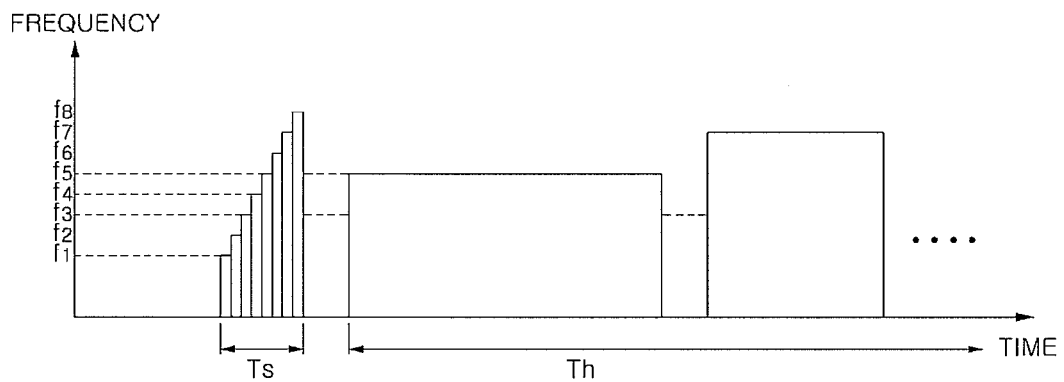
FIG. 4 is a view illustrating an example of changes in frequencies during cooking including a scan period of time and a heating period of time.

FIG. 3 is a block diagram briefly illustrating the inside of the cooking apparatus shown FIG. 1. In addition, FIG. 4 is a view illustrating an example of changes in frequencies during cooking including a scan period of time and a heating period of time.

Referring to the drawings, the cooking apparatus 100 according to the embodiment of the present invention includes a microwave generator 110 and a controller 310. In addition, the cooking apparatus 100 may further include a microwave transmitter 112.

The microwave transmitter 110 includes a frequency oscillator 332, a level controller 334 and an amplifier 336. In addition, the microwave generator 110 may further include a directional coupler 338.

The frequency oscillator 332 oscillates to output microwaves of the corresponding frequencies by frequency control signal from the controller 310. The frequency oscillator 332 may include a voltage controlled oscillator (VCO). The voltage controlled oscillator (VCO) oscillates the corresponding frequency according to voltage levels of the frequency controlled signal. For example, as the voltage level of the frequency controlled signal is increased, the frequency generated by being oscillated from the voltage controlled oscillator (VCO) is higher.

The level controller 334 controls to output microwaves as the corresponding power by a power control signal from the controller 310. The level controller 334 may include a voltage controlled attenuator (VCA). The voltage controlled attenuator (VCA) performs a calibration operation to output oscillates the corresponding frequency according to voltage levels of the frequency controlled signal. For example, as the voltage level of the power controlled signal is increased, the power level to be outputted from the voltage controlled attenuator (VCA) is higher.

The level controller 334 may output a constant power for each of a plurality of microwaves by receiving the same power controlled signal from controller 310 for each microwave, during the heating period of time.

In addition, since the constant power is outputted during the heating period of time using the microwaves, an additional level controller 334 for controlling the power cannot be required.

The amplifier 336 performs an amplifying operation to output the predetermined frequency and power through the frequency oscillator 332 and the level controller 334. The amplifier 336 may include the solid state power amplifier (SSPA) as described above, in particular, monolithic microwave integrated circuits (MMIC) using a single substrate. Accordingly, the amplifier 336 can be easily controlled by the controller 310, and the size is smaller so that the integration of the elements may be achieved.

The directional coupler (DC) 338 transmits microwaves amplified and outputted from the amplifier 336 to the microwave transmitter 112 The microwaves outputted from the microwave transmitter 112 heats the object of the cavity 134. Meanwhile, the microwaves reflected, not absorbed from the object are again inputted to the directional coupler 338 through the microwave transmitter 112. The directional coupler 338 transmits the reflected microwave to the controller 310.

Meanwhile, the microwave generator 110 may be disposed between the directional coupler 338 and the controller 310 and may further include DC converter (not shown) which converts the reflected microwave into a control signal. Herein, the DC converter (not shown) may be implemented as a diode element.

Meanwhile, the microwave generator 110 may be disposed between the amplifier 336 and the directional coupler 338 and when the microwave amplified from the amplifier 336 is transmitted to the cavity 134, the microwave is passed and a separation unit (not shown) to block the microwave reflected from the cavity 134 may be further included. Herein, the separation unit (not shown) may be implemented with an isolator.

Meanwhile, in addition to the frequency oscillator 332, the level controller 334 and the amplifier 336, the directional coupler 338 may be implemented as one module. That is, all components described above are disposed on one substrate and may be implemented as one module. Due to the integration of the elements, the microwave generator 110 can be easily controlled by the controller 310.

The controller 310 controls overall operations of the cooking apparatus. When the operating signal of the cooking apparatus is inputted through the operating unit 107, the microwave generator 110 is controlled to output the microwaves.

In addition, the controller 310 calculates heating efficiency with respect to each of the plurality of microwaves based on the microwaves reflected from the inside of the cavity among the microwaves outputted from the microwave generator 110, and then sets heating time with respect to each microwave during a heating period of time according to the calculated heating efficiency.

In this case, the controller 310 controls such that when the heating efficiency of a first microwave among the plurality of microwaves is higher than that of a second microwave, the heating time of the first microwave is set to be shorter than that of the second microwave.

Specifically, the controller 310 controls such that frequency controlled signal is outputted and the corresponding frequencies is oscillated in the frequency oscillator 332.

Meanwhile, the controller 310 can output the frequency controlled signal of the different voltage levels in order to output the microwaves having a plurality of frequencies. Accordingly, the frequency oscillator 332 oscillates the corresponding frequency according to the voltage level of the inputted frequency control signal. Meanwhile, the plurality of frequency controlled signal may be sequentially outputted from the controller 310.

The controller 310 controls such that a power controlled signal is outputted so that the corresponding power level may be outputted in the frequency oscillator 334.

In this case, the controller 310 can output the same power controlled signal with respect to the each microwave to the microwave generator during the heating period of time. In addition, the level controller 334 can output a constant power level according to the inputted power controlled signal.

Meanwhile, the controller 310 may calculate the heat efficiency based on the microwaves reflected, not absorbed to the object of microwaves discharged to the cavity 134.

$$he=(Pt-Pr)/Pt \qquad \text{[Equation 1]}$$

Herein, Pt represents a power of the microwave discharged to the inside of the cavity 134, Pr indicates a power of the microwave discharged from the cavity 134 and he represents a heat efficiency of the microwave. That is, the heating efficiency is smaller, as the power of the reflected microwave is greater.

Meanwhile, when a plurality of microwaves is discharged into the cavity 134, the controller 310 calculates the heat efficiency he for each frequency of the plurality of microwaves. The heating efficiency calculation is preferably performed in a scan period of time among the scan period and a heating period of time within overall cooking periods.

Meanwhile, the overall cooking periods can be performed in the heating period of time after being performed in the scan period of time, or in the heating period while performing in the scan period of time. In addition, heating efficiency calculation can be repeatedly performed in the overall cooking periods.

That is, the controller 310 can calculates the heating efficiency he for each frequency through microwaves reflected by sequentially discharging a plurality of microwaves into the cavity 134, among the cooking periods set by a user.

Subsequently, the controller 310 controls a discharged time of microwaves for each frequency within the heating period of time which is actual cooking period according to the calculated heating efficiency he. That is, the heating efficiency he is higher, as the discharged time is preferably shorter. Accordingly, the microwaves can be uniformly absorbed in the heating object 140 inside the cavity 134 for each frequency to heat the heating object 140 uniformly.

Meanwhile, the controller 310 controls such that microwaves of the corresponding frequency may be discharged in the heating period only when the heating efficiency he calculated for each frequency is equal to or greater than a predetermined value. That is, the heating object 140 can be effectively heated uniformly by actually excluding microwaves of the frequencies that the heating efficiency he is significantly lower.

Meanwhile, the discharge of the plurality of microwaves can be sequentially performed in time.

Meanwhile, according to another embodiment of the present invention, the controller 310 can use the microwaves when heating by selecting the microwaves of frequencies corresponding to the heating efficiency down adjusted by setting value from the maximum heating efficiency when the microwaves of frequencies that a heating efficiency is equal to or greater than a threshold value, based on the microwaves reflected from the inside of the cavity among the outputted microwaves, do not exist.

In this case, the controller 310 controls such that in the scan period of time among the cooking process using microwaves including the scan period of time and the heating period of time, microwaves of frequencies to be used during the heating period of time can be selected.

Meanwhile, the controller 310 such that when the microwaves having frequencies that a heating efficiency is equal to or greater than a threshold value, based on the microwaves reflected among the microwaves outputted to the cavity, do not exist, the threshold value can be down adjusted In this case, the controller controls such that after the threshold value is down adjusted, the microwaves having frequencies to be used when heating according to the down adjusted threshold value can be selected by re-performing the scan process.

Meanwhile, according to the embodiment of the present invention, the controller 310 controls such that heating efficiency for each of the plurality of microwaves is calculated based on the microwaves reflected from the inside of the cavity among the microwaves outputted from the microwave generator 110, a heating mod is selected according to the calculated heating efficiency and the same energy is supplied by the selected heating mode.

In this case, the controller 310 can select the heating mode on the basis of a peak value of the calculated heating efficiency. Accordingly, the controller 310 can control such that the same energy is supplied with respect to each of microwaves having frequencies corresponding to the peak value of the calculated heating efficiency.

Meanwhile, the controller 310 can select the heating mode on the basis of a predetermined threshold value for the calculated heating efficiency.

Accordingly, the controller 310 controls such that the total energy is equally supplied by each of the selected heating modes by supplying the heating energy to be inversely proportional to the frequency range for each of the selected heating modes.

That is, the controller 310 controls such that the total energy may be equally supplied by each of the selected heating modes by reducing the heating energy when the frequency range of the selected heating mode is wide and by increasing the heating energy when the frequency range of the selected heating mode is narrow.

Meanwhile, the control unit 310 can control to display the overall operation states of the cooking apparatus through a display unit 105. For example, when the current period of time is the scan period of time among the entire cooking period of time, the display can be performed through the display unit 105. Further, when current period of time is the actual heating period of time, the display can be implemented. In addition, various types of display functions such as the remaining time of the entire cooking period of time can be performed.

The power supply 114 outputs a high voltage to the microwave generator 110 by boosting power inputted to the cooking apparatus 100 The power supply 114 may be implemented as a high voltage transformer or an inverter. Meanwhile, the power supply 114 can generate and supply a predetermined control power for the control operation of a controller (not shown).

Meanwhile, the controller 310 and the microwave generator 110 can be implemented as one module. That is, the controller 310 and the microwave generator 110 can be implemented by being integrated on one substrate.

Referring to the mentioned configuration, a heating time control process for each frequency according to the present invention is described below.

The controller 310 outputs a frequency control signal for sweeping microwaves of the various frequencies to the frequency oscillator 332 of the microwave generator 110 during the scan period of time.

The frequency oscillator 332 generates a plurality of microwaves according to the frequency control signal inputted from the controller 310.

The level controller 334 controls levels corresponding to amplitudes of the microwaves generated by the frequency oscillator 332 according to a power control signal inputted from the controller 310. In this case, the power control signal outputted to the level controller 334 by the controller 500 may be provided as the same signal for all microwaves to be used in the sweep process.

The amplifier 336 amplifies microwaves that the level is adjusted, a separation unit (not shown) provides the amplified microwaves to a directional coupler 520 and the directional coupler 338 provides microwaves provided by the separation unit (not shown) to the microwave transmitter 112.

The microwave transmitter 112 outputs microwaves provided by the directional coupler 520 to the cavity 134.

Meanwhile, when a portion of microwaves outputted from the cavity 134 is reflected, the directional coupler 338 provides the reflected microwaves to a DC converter (not shown).

The DC converter (not shown) outputs a feedback signal converting the portion of microwaves reflected from the cavity 134 into DC to the controller 310.

The controller 310 calculates the heating efficiency for each of a plurality of microwaves based on the inputted feedback signal. In this case, the controller 310 can determine that the heating efficiency is higher when the feedback signal for each of microwaves is small.

In addition, the controller 310 controls to vary the heating time for each of microwaves, that is, the discharge time for each of microwaves during the heating period of time, according to the heating efficiency for each of calculated microwaves. In this time, the controller 310 controls such that the heating time is short with respect to the microwave that the calculated heating efficiency is high and the heating time is longer with respect to the microwave that the calculated heating efficiency is low.

For example, as a result of the calculation of the heating efficiency, when the heating efficiency with respect to the microwave of frequency f5 is low, the controller 310 controls such that the heating time with respect to the microwave of frequency f5 is relatively long during the heating period Th of time shown in FIG. 4, and when the heating efficiency with respect to the microwave of frequency f3 is high, the controller 310 controls such that the heating time with respect to the microwave of frequency f3 is relatively short during the heating period Th of time.

In this case, the heating period Th of time shown in FIG. 4 can be determined by the user's operation or a kind of object inside the cavity 134, a predetermined gap time may be between the scan period Ts of time and the heating period of time Th, and the heating period Th of time can be maintained to be longer than the scan period Ts. In addition, the scan period of time and the heating period of time can be repeatedly performed during the cooking process using microwaves.

That is, the controller 310 controls such that the frequency control signal for generating microwaves of the corresponding frequency is provided to the frequency oscillator 332 of the microwave generator 110 during a short time with regard to microwaves that the heating efficiency is high and the frequency control signal for generating microwaves of the corresponding frequency is provided to the frequency oscillator 332 of the microwave generator 110 during a long time with regard to microwaves that the heating efficiency is low.

The frequency oscillator 332 generates the corresponding microwaves according to the frequency control signal provided from the controller 310.

The level controller 334 controls levels corresponding to amplitudes of the microwaves generated by the frequency oscillator 332 according to a power control signal provided from the controller 310. In this case, the power control signal provided to the level controller 334 by the controller 310 may be provided as the same signal for all microwaves to be used in the heating period of time.

The amplifier 336 amplifies microwaves that the level is adjusted, a separation unit (not shown) provides the amplified microwaves to a directional coupler 338, the directional coupler 338 provides microwaves provided by the separation unit (not shown) to the microwave transmitter 112 and the microwave transmitter 112 outputs microwaves provided by the directional coupler 338 to cavity 134.

Accordingly, an uniform power can be transmitted to an object inside a cavity by decreasing a heating time for microwaves having a high heating efficiency and increasing the heating time for microwaves having a low heating efficiency.

Figure 5:
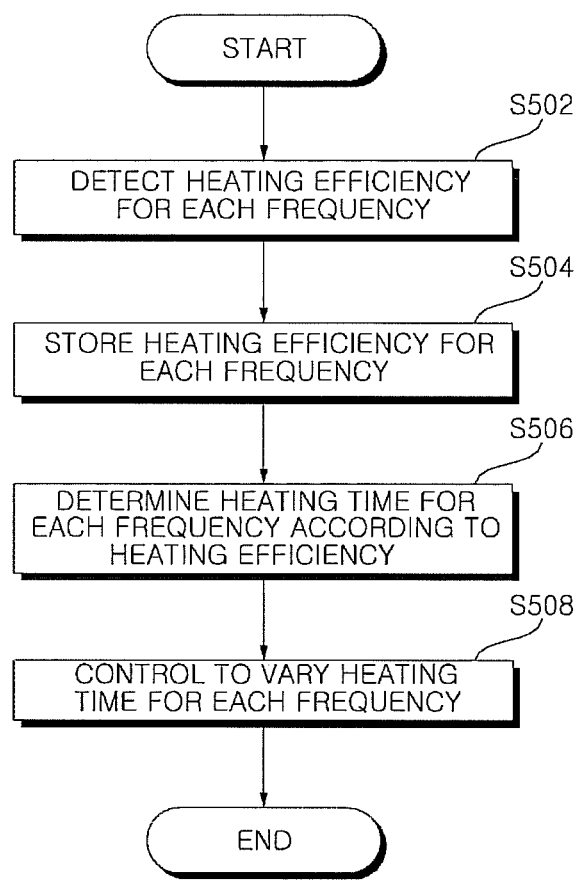
FIG. 5 is a flow chart illustrating a control method of a cooking apparatus using microwaves according to an embodiment of the present invention.
Figure 6:
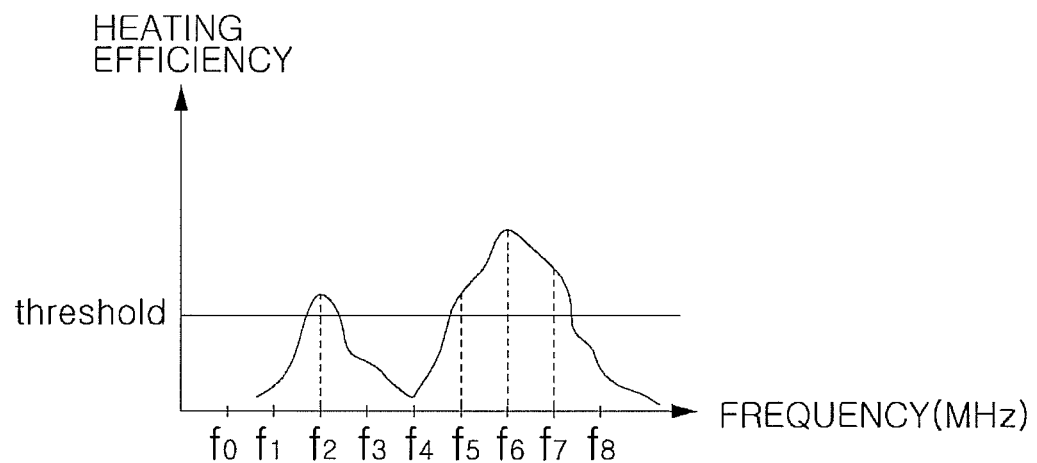
FIGS. 6 and 7 are views for referring to the description of FIG. 5.
Figure 7:
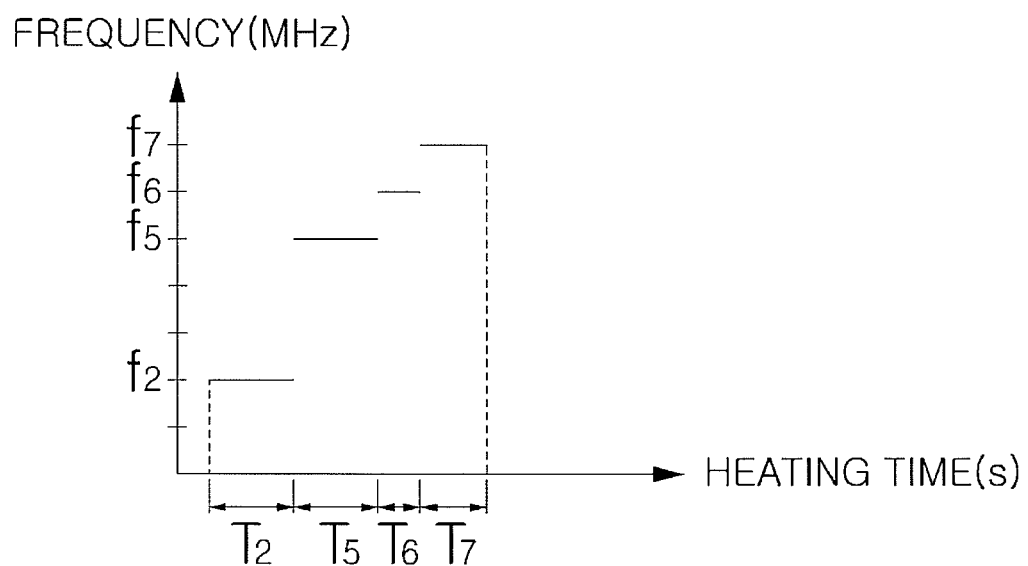

FIG. 5 is a flow chart illustrating a control method of a cooking apparatus using microwaves according to an embodiment of the present invention; FIG. 6 is a view illustrating a heating efficiency for each of frequency according to an embodiment of the present invention; and FIG. 7 is a view illustrating a heating time for each of frequency according to an embodiment of the present invention.

Referring to FIG. 5, a controller of the cooking apparatus using microwaves according to the present invention detects a heating efficiency for each of frequencies as shown in FIG. 6 by sweeping the microwaves of various frequencies (S502).

That is, the controller sequentially outputs the frequency control signal to the frequency oscillator of the microwave generator and the frequency oscillator generates microwaves of the corresponding frequency according to the frequency control signal outputted from the controller.

The level controller of the microwave generator controls levels corresponding to amplitudes of the microwaves generated by the frequency oscillator according to a power control signal provided from the controller.

The amplifier provided in the microwave generator amplifies microwaves that the level is adjusted, and a separation unit provided in the microwave generator provides the amplified microwaves to a directional coupler provided in the microwave generator.

The directional coupler provides microwaves provided by the separation unit to the microwave transmitter and the microwave transmitter outputs microwaves provided by the directional coupler to cavity.

In addition, when a portion of microwaves outputted from the cavity through microwave transmitter is reflected, the directional coupler provides the reflected microwaves to a DC converter and the DC converter provides a feedback signal converting the portion of the provided microwaves into DC to the controller.

The controller calculates the heating efficiency for each of a plurality of microwaves based on the provided feedback signal. In this case, the controller can calculates that the heating efficiency is higher when the feedback signal for each of microwaves is small.

Meanwhile, the controller can store the calculated heating efficiency for each of the frequency through a storage unit (S504).

In addition, the controller determines the heating time for each of microwaves according to the heating efficiency for each of detected microwaves (S506) That is, the controller may control such that the heating time is short with respect to the microwave that the calculated heating efficiency is high and the heating time is longer with respect to the microwave that the calculated heating efficiency is low.

For example, referring to FIGS. 6 and 7, since the heating efficiency with respect to the microwave of frequency f2 is lower than the heating efficiency with respect to the microwave of frequency f6, the controller can determine that the heating time with respect to the microwave of frequency f2 is relatively longer than the heating time with respect to the microwave of frequency f6. In addition, a predetermined gap time may be between the heating times for each of frequencies.

In this case, the controller may use only microwaves f2, f5, f6 and f7 of frequencies that the calculated heating efficiency is equal to or greater than the threshold in the heating process.

In addition, the controller controls to vary the heating time for each of frequencies according to the heating time for each of determined microwaves as described above (S508).

That is, the controller controls such that the frequency control signal for generating microwaves of the corresponding frequency is outputted to the frequency oscillator of the microwave generator during a short time with regard to microwaves that the heating efficiency is high and the frequency control signal for generating microwaves of the corresponding frequency is provided to the frequency oscillator of the microwave generator during a long time with regard to microwaves that the heating efficiency is low.

The frequency oscillator provided in the microwave generator generates the corresponding microwaves according to the frequency control signal inputted from the controller.

The level controller of the microwave generator controls levels corresponding to amplitudes of the microwaves generated by the frequency oscillator according to a power control signal provided from the controller. In this case, the power control signal provided to the level controller by the controller 310 may be provided as the same signal for all microwaves to be used in the heating period of time.

The amplifier provided in the microwave generator amplifies microwaves that the level is adjusted, a separation unit provided in the microwave generator provides the amplified microwaves to a directional coupler provided in the microwave generator, the directional coupler microwaves provided by the separation unit to the microwave transmitter, and the microwave transmitter outputs microwaves provided by the directional coupler to the cavity.

Accordingly, an uniform power can be transmitted to an object inside a cavity by decreasing a heating time for microwaves having a high heating efficiency and increasing the heating time for microwaves having a low heating efficiency to heat the object inside the cavity uniformly.

Figure 8:
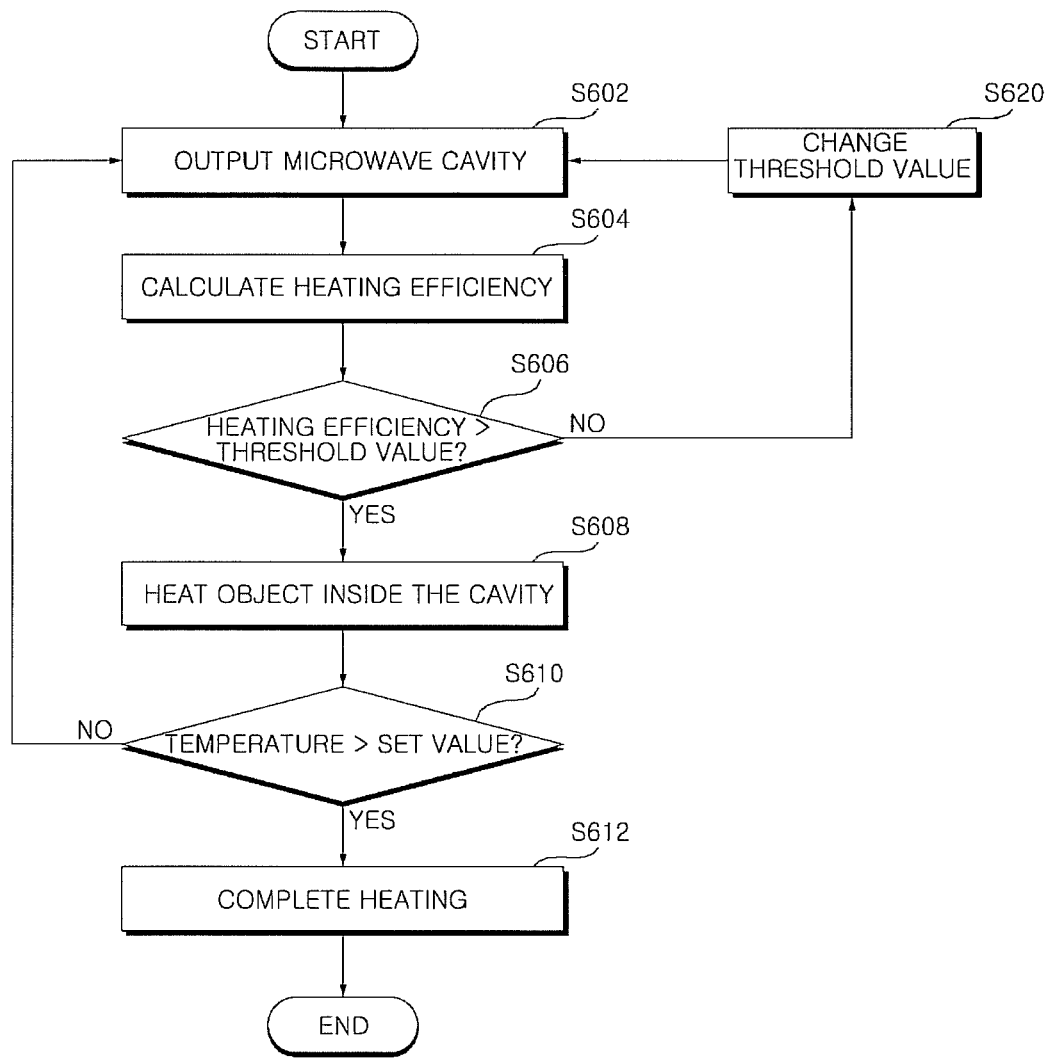
FIG. 8 is a flow chart illustrating a control method of a cooking apparatus using microwaves according to another embodiment of the present invention.
Figure 9:
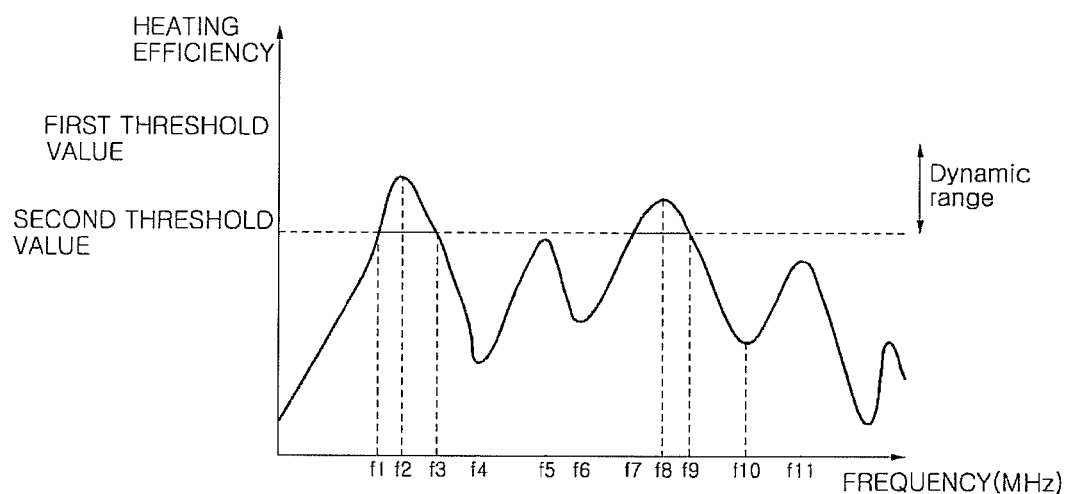
FIG. 9 is a view for referring to the description of FIG. 8.

FIG. 8 is a flow chart illustrating a control method of a cooking apparatus using microwaves according to another embodiment of the present invention; and FIG. 9 is a view illustrating an example of a heating efficiency for each of frequencies.

Referring to FIG. 8, the controller of the cooking apparatus using microwaves according to the present invention generates the microwaves of a variety of frequencies to output the generated microwaves to the cavity (S602).

Subsequently, the controller detects the heat efficiency for each of frequencies as shown in FIG. 9 based on the microwaves reflected from the cavity among the outputted microwaves (S604).

That is, the controller sequentially outputs the frequency control signal to the frequency oscillator of the microwave generator and the frequency oscillator generates microwaves of the corresponding frequency according to the frequency control signal outputted from the controller.

The level controller of the microwave generator controls levels corresponding to amplitudes of the microwaves generated by the frequency oscillator according to a power control signal provided from the controller.

The amplifier provided in the microwave generator amplifies microwaves that the level is adjusted, and a separation unit provided in the microwave generator provides the amplified microwaves to a directional coupler provided in the microwave generator.

The directional coupler provides microwaves transmitted by the separation unit to the microwave transmitter and the microwave transmitter outputs microwaves provided by the directional coupler to the cavity.

In addition, when a portion of microwaves outputted from the cavity through microwave transmitter is reflected, the directional coupler provides the reflected microwaves to a DC converter and the DC converter provides a feedback signal converting the portion of the provided microwaves into DC to the controller.

The controller calculates the heating efficiency for each of a plurality of microwaves based on the provided feedback signal. In this case, the controller can calculates that the heating efficiency is higher when the feedback signal for each of microwaves is small.

Meanwhile, the controller confirms whether microwaves having the calculated heating efficiency greater than the threshold exist (S606).

As a result of the confirmation, when microwaves having the calculated heating efficiency greater than the threshold do not exist, the controller down adjusts the threshold by changing a first threshold to a second threshold (S620).

In addition, the controller controls such that after the threshold value is down adjusted, the microwaves having frequencies to be used when heating according to the down adjusted threshold value can be selected by re-performing the scan process (S602 to S606).

Meanwhile, the controller controls such that the object of the inside of the cavity can be heated by using microwaves of selected frequencies (S608).

In addition, the controller compares a temperature of the object of the inside of the cavity with the set value after heating (S610), determines as the heating is complete when the temperature is greater than the set value, and re-performs the processes (S602 to S608) when the temperature is lower than the set value.

Accordingly, as shown in FIG. 9, when using the first threshold, there are no usable microwaves when heating, but when using the second threshold, a microwave of the frequency f2 and a microwave of the frequency f8 can be used when heating.

Figure 10:
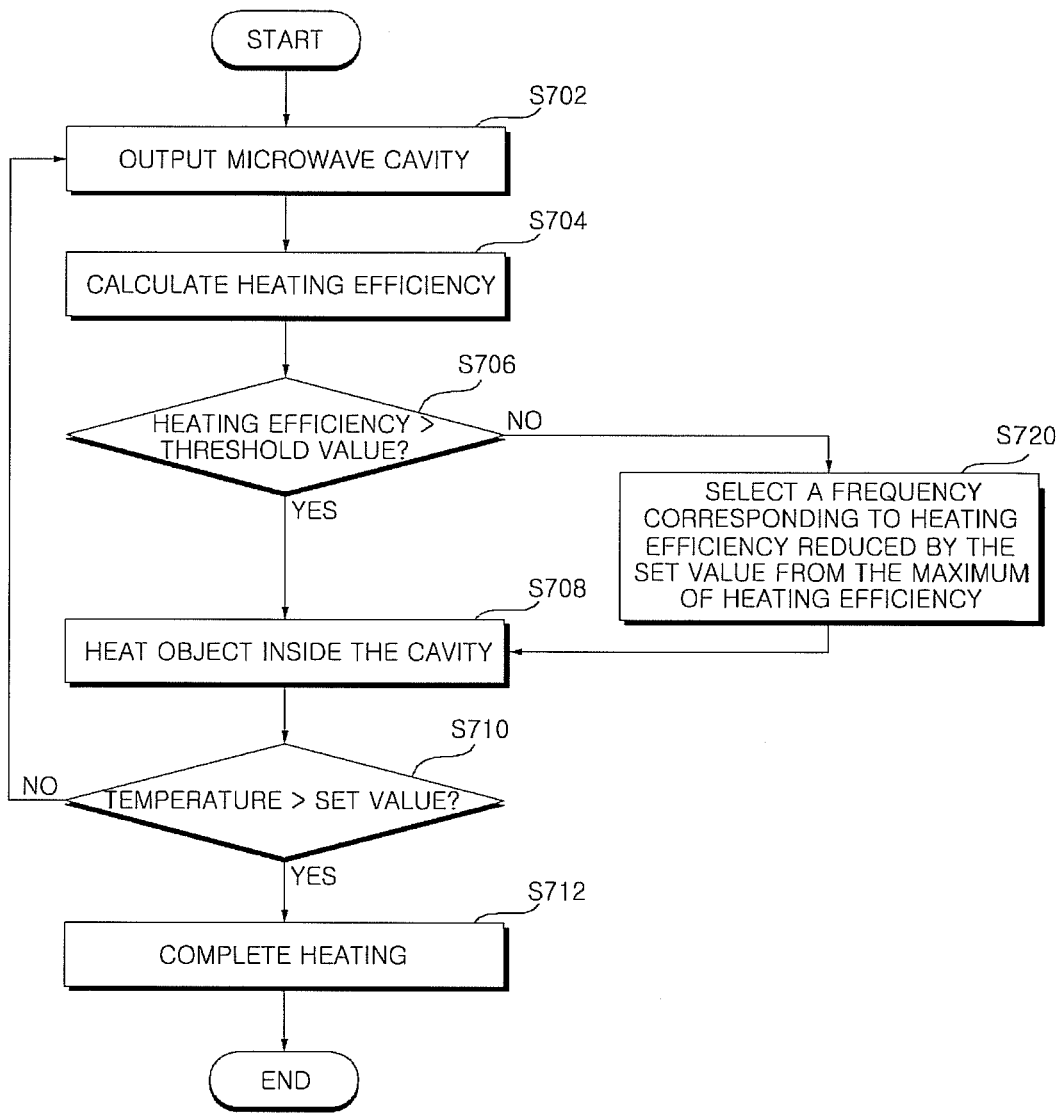
FIG. 10 is a flow chart illustrating a control method of a cooking apparatus using microwaves according to another embodiment of the present invention.

FIG. 10 is a flow chart illustrating a control method of a cooking apparatus using microwaves according to another embodiment of the present invention; and FIG. 9 is a view illustrating another example of a heating efficiency for each of frequencies.

Referring to FIG. 10, the controller of the cooking apparatus using microwaves according to the present invention generates the microwaves of a variety of frequencies to output the generated microwaves to the cavity (S702).

Figure 11:
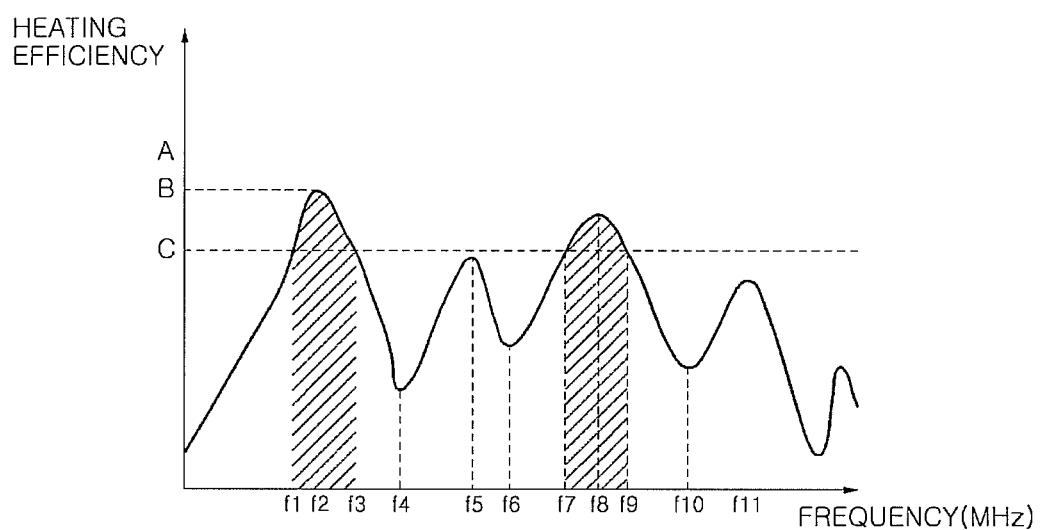
FIG. 11 is a view for referring to the description of FIG. 10.

Subsequently, the controller detects the heat efficiency for each of frequencies as shown in FIG. 11 based on the microwaves reflected from the cavity among the outputted microwaves (S704).

That is, the controller sequentially outputs the frequency control signal to the frequency oscillator of the microwave generator and the frequency oscillator generates microwaves of the corresponding frequency according to the frequency control signal outputted from the controller.

The level controller of the microwave generator controls levels corresponding to amplitudes of the microwaves generated by the frequency oscillator according to a power control signal provided from the controller.

The amplifier provided in the microwave generator amplifies microwaves that the level is adjusted, and a separation unit provided in the microwave generator provides the amplified microwaves to a directional coupler provided in the microwave generator.

The directional coupler provides microwaves provided by the separation unit to the microwave transmitter and the microwave transmitter outputs microwaves provided by the directional coupler to cavity.

In addition, when a portion of microwaves outputted from the cavity through microwave transmitter is reflected, the directional coupler provides the reflected microwaves to a DC converter and the DC converter provides a feedback signal converting the portion of the provided microwaves into DC to the controller.

The controller calculates the heating efficiency for each of a plurality of microwaves based on the provided feedback signal. In this case, the controller can calculates that the heating efficiency is higher when the feedback signal for each of microwaves is small.

Meanwhile, the controller confirms whether microwaves that the calculated heating efficiency is greater than the threshold exist (S706).

As a result of the confirmation, when microwaves having the calculated heating efficiency greater than the threshold do not exist, the controller controls such that the microwave of the frequency corresponding to heating efficiency down adjusted by the set value from the maximum of heating efficiency is selected to be used when heating (S720).

For example, as shown in FIG. 11, the controller controls such that when the microwave having the frequency that the heating efficiency is greater than the threshold is not found from the first threshold A, the microwave of the each of the corresponding frequencies f1, f2, f3, f7, f8, f9 from the second threshold C down adjusted by the set value from the maximum of heating efficiency B among the calculated heating efficiencies is selected to be used when heating.

Meanwhile, the controller controls such that the object of the inside of the cavity can be heated by using microwaves of selected frequencies (S708).

In addition, the controller compares a temperature of the object of the inside of the cavity with the set value after heating (S710), determines as the heating is complete when the temperature is greater than the set value (S712), and re-performs the processes (S702 to S708) when the temperature is lower than the set value.

Figure 12:
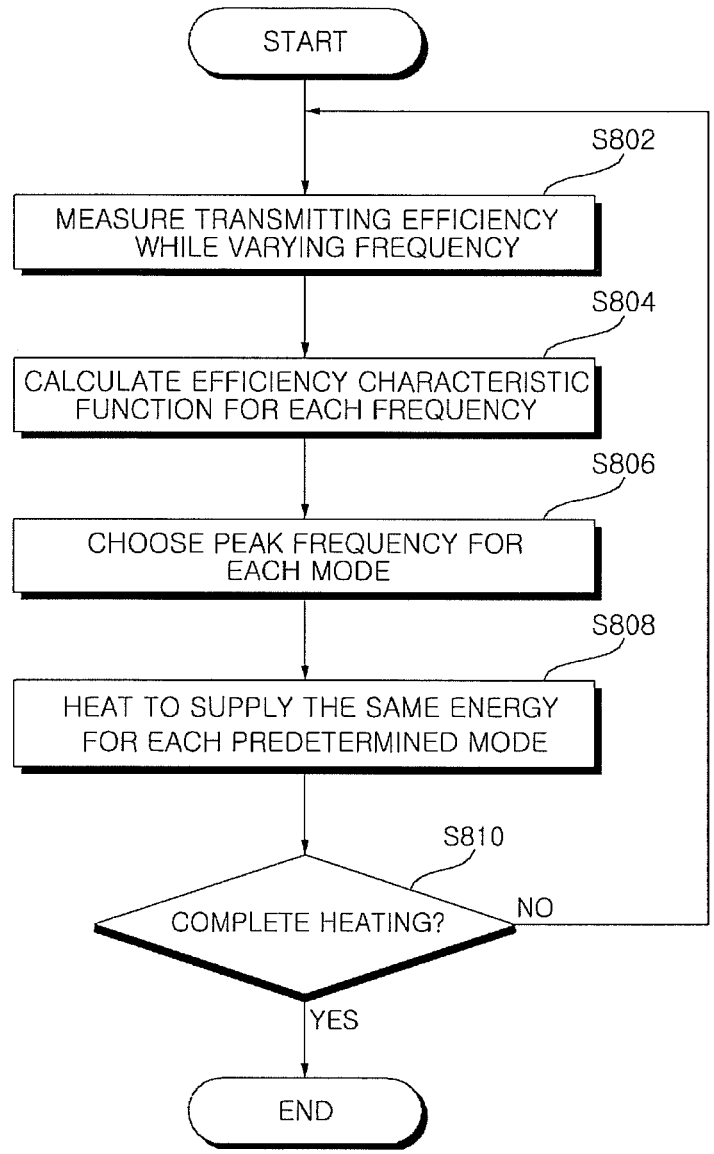
FIG. 12 is a flow chart illustrating a control method of a cooking apparatus using microwaves according to another embodiment of the present invention.
Figure 13:
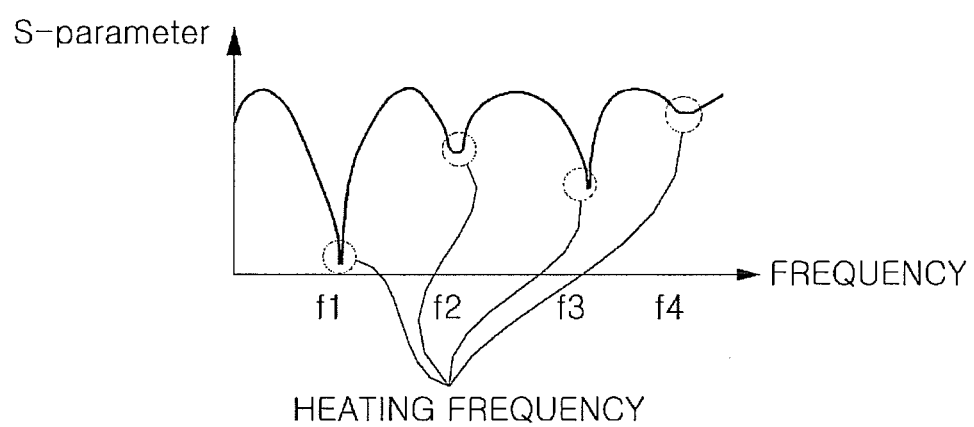
FIGS. 13 and 14 are views for referring to the description of FIG. 12.

FIG. 12 is a flow chart illustrating a control method of a cooking apparatus using microwaves according to another embodiment of the present invention; FIG. 13 is a view illustrating a heating efficiency for each of frequency; and FIG. 14 is a view illustrating a heating energy for each of heating modes according to FIG. 13.

Referring to the drawings, the controller of the cooking apparatus using microwaves according to the present invention can calculate an efficiency characteristic function (for example, S-parameter function or efficiency function) (S804) as shown in FIG. 13 by sweeping microwaves of a variety of frequencies and measuring a transmitting efficiency (S802).

In addition, the controller of the cooking apparatus using microwaves selects a firs heating mode, a second heating mode, a third heating mode and a fourth heating mode corresponding to each of frequencies f1, f2, f3 and f4 and choose peak frequencies f1, 12, f3 and f4 for each mode (S806).

Figure 14:
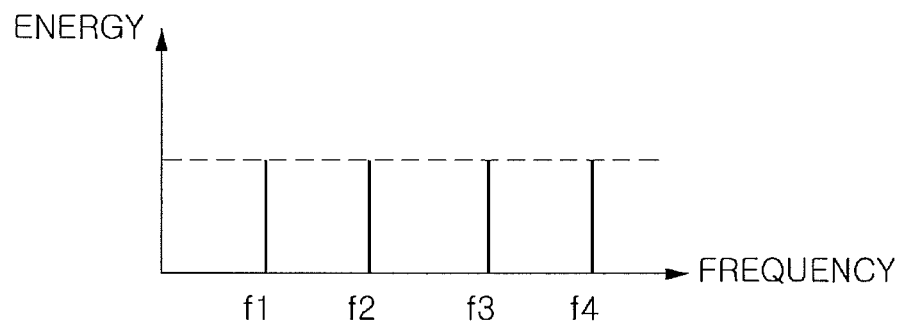

In addition, the controller of the cooking apparatus using microwaves controls to supply the same energy for the chosen each mode as shown in FIG. 14.

Subsequently, the controller of the cooking apparatus using microwaves confirms whether the heating is completed (S810), and then ends the control when the heating with regard to the object inside the cavity is completed.

Accordingly, the heating mode can be selected by representing a resonance mode by each peak from the S-parameter function or the efficiency function and by uniformly forming various heating modes without representing a heating pattern of the specific heating mode by an non-uniformly heating after the same energy is supplied for each heating mode to optimize a uniform heating.

Figure 15:
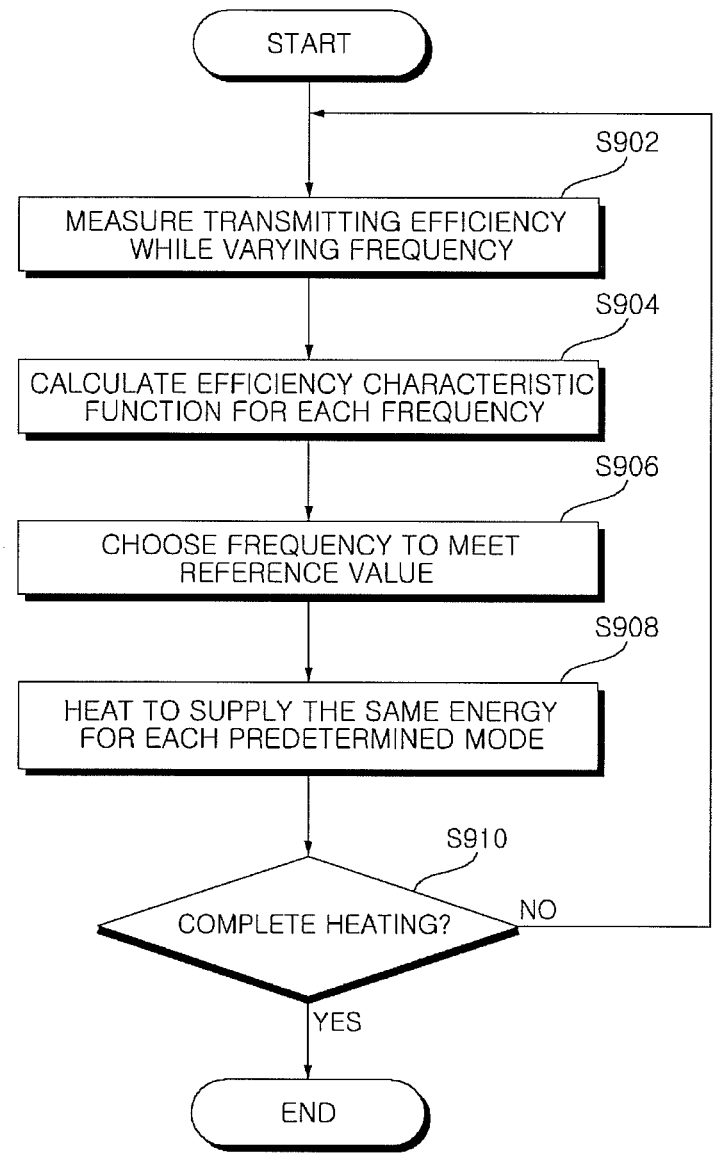
FIG. 15 is a flow chart illustrating a control method of a cooking apparatus using microwaves according to another embodiment of the present invention.
Figure 16:
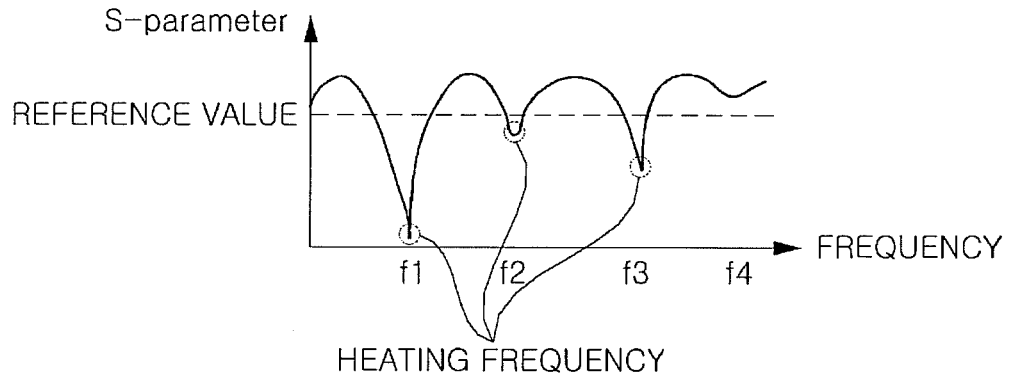
FIGS. 16 to 23 are views for referring to the description of FIG. 15.

FIG. 15 is a flow chart illustrating a control method of a cooking apparatus using microwaves according to another embodiment of the present invention; FIG. 16 is a view illustrating a heating efficiency for each of frequency; and FIG. 17 is a view illustrating a heating energy for each of heating modes according to FIG. 16.

Referring to the drawings, the controller of the cooking apparatus using microwaves according to the present invention can calculate an efficiency characteristic function (for example, S-parameter function or efficiency function) (S904) as shown in FIG. 16 by sweeping microwaves of a variety of frequencies and measuring a transmitting efficiency (S902).

In addition, the controller of the cooking apparatus using microwaves selects frequency ranges (that center frequencies are corresponded to f1, f2, f3 respectively) to meet a reference value as a first heating mode, a second heating mode, a third heating mode and a fourth heating mode and choose frequencies to meet the reference value for each heating mode, as shown in FIG. 16. (S906).

Figure 17:
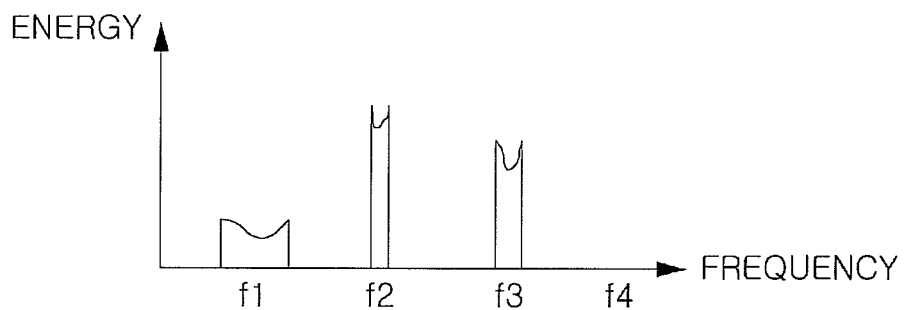

In addition, the controller of the cooking apparatus using microwaves controls to supply the same energy for the chosen each mode as shown in FIG. 17. (S908).

That is, the controller of the cooking apparatus using microwaves controls such that the energy may be equally supplied by each of the selected heating modes by reducing the heating energy when the frequency range of the selected heating mode is wide (for example, when the center frequency is f1 as shown in FIG. 17) and by increasing the heating energy when the frequency ranges of the selected heating mode is narrow (for example, when the center frequency is f2 as shown in FIG. 17) Accordingly, each area of three kinds of heating modes may be the same as shown in FIG. 17.

Subsequently, the controller of the cooking apparatus using microwaves confirms whether the heating is completed (S910), and then ends the control when the heating with regard to the object inside the cavity is completed.

Accordingly, the heating mode that satisfies the reference value of the S-parameter function is selected, and the same energy is supplied for each heating mode and then various heating modes can be uniformly formed without representing a heating pattern of the specific heating mode to optimize a uniform heating.

Figure 18:
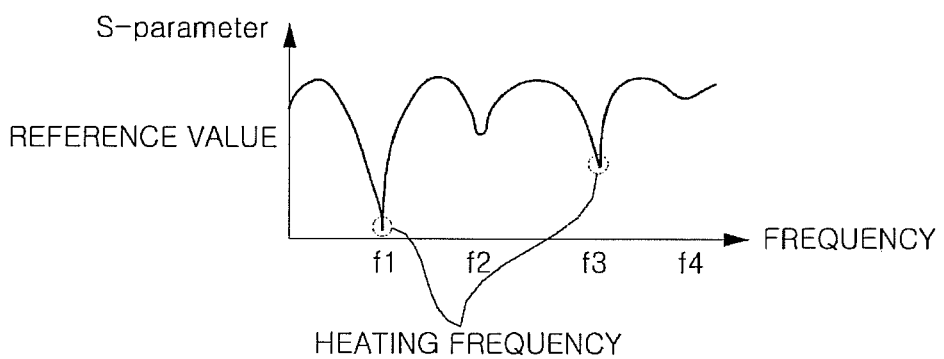
Figure 19:
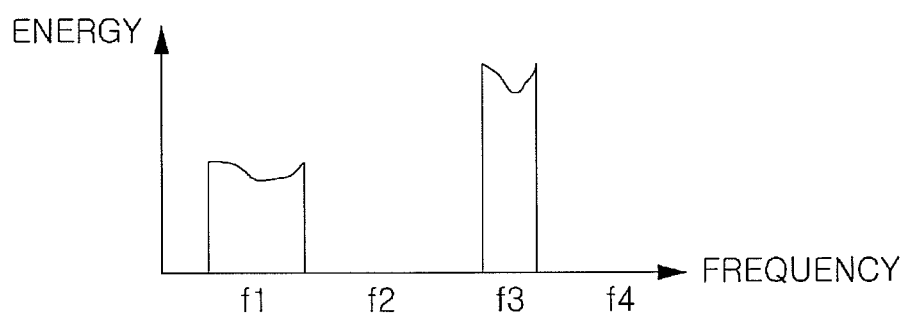
Figure 20:
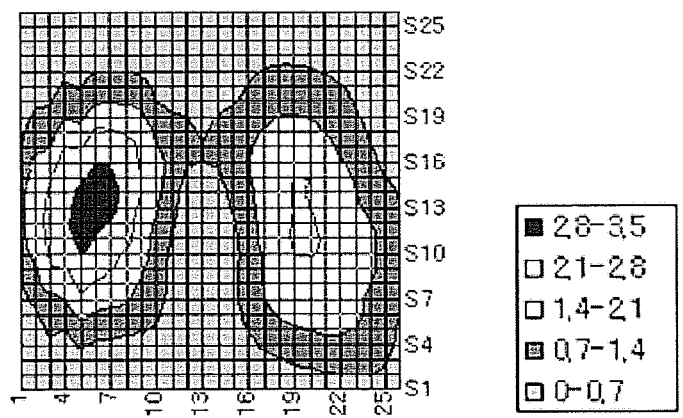
Figure 21:
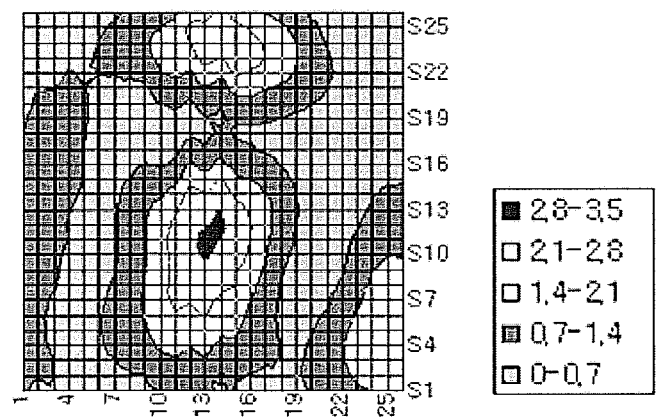
Figure 22:
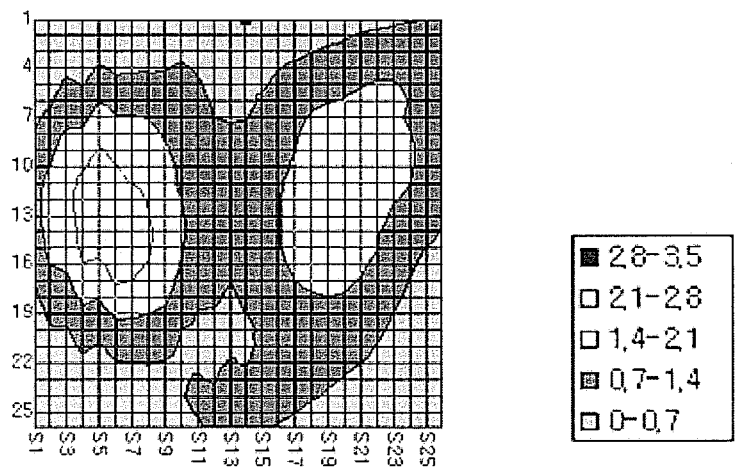

FIG. 18 is a view illustrating another example of a heating efficiency for each frequency; FIG. 19 is a view illustrating a heating energy for each heating mode according to FIG. 18; FIG. 20 is a view illustrating a heating pattern corresponding to a first heating mode shown in FIG. 19; FIG. 21 is a view illustrating a heating pattern corresponding to a second heating mode shown in FIG. 19; FIG. 22 is a view illustrating when generally forming a first heating mode and a second heating mode at the same time; and FIG. 23 is a view illustrating when generally forming a first heating mode and a second heating mode at the same time according to the present invention.

Referring to the drawings, the controller of the cooking apparatus using microwaves according to the present invention can calculate an efficiency characteristic function (for example, S-parameter function) as shown in FIG. 18 by sweeping microwaves of a variety of frequencies and measuring a transmitting efficiency.

In addition, the controller of the cooking apparatus using microwaves selects frequency ranges (that center frequencies are corresponded to f1 and f2, respectively) to meet a reference value as a first heating mode and a second heating mode and supplies the same energy for the chosen each heating mode, as shown in FIG. 18.

Figure 23:
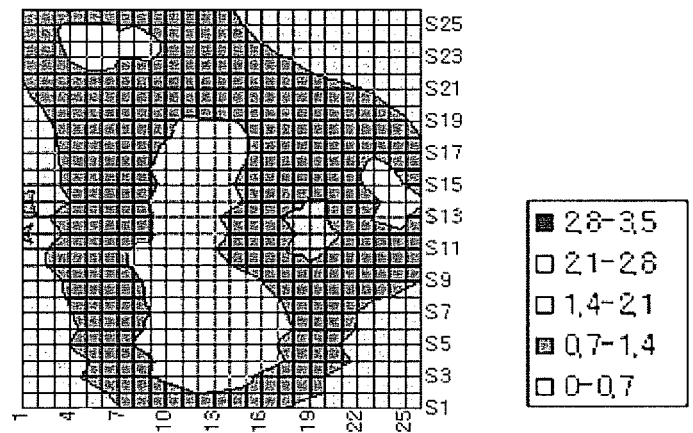

Accordingly, the standard deviation of a heating pattern shown in FIG. 23 is less than that of a heating pattern shown in FIG. 22 and the difference between the maximum and the minimum values is small, and then the first heating mode and the second heating mode can be uniformly formed to optimize a uniform heating In this case, the standard deviation may be a standard deviation of a pixel and a temperature.

Those skilled in the art will understand that the present invention can be implemented as other concrete forms without changing the inventive concept or essential features. Therefore, these embodiments as described above are only proposed for illustrative purposes and do not limit the present invention. It will be apparent to those skilled in the art that a variety of modifications and variations may be made without departing the spirit and scope of the present invention as defined by the appended claims. Further, such modifications and variations should not be understood independently from the technical idea or perspective of the present invention.

The invention claimed is:

1. A cooking apparatus using microwaves, comprising:
a microwave generator to sequentially generate and output a plurality of microwaves having different frequencies from each other;
a microwave transmitter to transmit the plurality of microwaves into a cavity; and
a controller to calculate heating efficiency of each of the plurality microwaves based on the plurality of microwaves reflected from the cavity, and to set heating time of each of the plurality of microwaves during a heating period based on the calculated heating efficiency,
wherein the controller is configured to control the microwave generator to output a part of the plurality of microwaves in the heating period based on the calculated heating efficiency;
wherein the microwave generator includes:
a frequency oscillator to oscillate to output microwaves of corresponding frequencies by a frequency control signal from the controller,
a level controller to output microwaves as corresponding power by a power control signal from the controller,
an amplifier to perform an amplifying operation to output predetermined frequency and power through the frequency oscillator and the level controller, and
a directional coupler to transmit microwaves amplified and outputted from the amplifier to the microwave transmitter, and the directional coupler to transmit reflected microwave to the controller,
wherein the reflected microwave is not absorbed into the cavity and is inputted to the directional coupler through the microwave transmitter.

2. The cooking apparatus of claim 1, wherein the controller controls the microwave generator such that when the heating efficiency of a first microwave, from among the plurality of microwaves, is higher than heating efficiency of a second microwave, the heating time of the first microwave is set to be shorter than heating time of the second microwave.

3. The cooking apparatus of claim 1, wherein the microwave generator outputs a constant power with respect to each of the plurality of microwaves during the heating period.

4. The cooking apparatus of claim 1, wherein the controller controls the microwave generator such that the heating time with respect to each microwave is set during the heating period by selecting only microwaves that the calculated heating efficiency is equal to or higher than a criterion efficiency.

5. The cooking apparatus of claim 1, wherein the controller controls the microwave generator such that the heating efficiency is calculated in a scan period among the cooking process using microwaves including the scan period and the heating period.

6. A cooking apparatus using microwaves, comprising:
a microwave generator to sequentially generate and output a plurality of microwaves having different frequencies from each other;
a microwave transmitter to transmit the plurality of microwaves into a cavity; and
a controller to calculate heating efficiency of each of the plurality of microwaves based on the plurality of microwaves reflected from the cavity, to determine maximum efficiency from among the calculated heating efficiencies, to set a reference efficiency value lower than the maximum efficiency by a predetermined value, and to select microwaves from among the plurality of microwaves having heating efficiencies greater than the reference efficiency value when the determined maximum efficiency is lower than a threshold value,
wherein the controller is configured to control the microwave generator to output a part of the plurality of microwaves in a heating period based on the calculated heating efficiency,
wherein the microwave generator includes:
a frequency oscillator to oscillate to output microwaves of corresponding frequencies by a frequency control signal from the controller;
a level controller to output microwaves as corresponding power by a power control signal from the controller;
an amplifier to perform an amplifying operation to output predetermined frequency and power through the frequency oscillator and the level controller; and
a directional coupler to transmit microwaves amplified and outputted from the amplifier to the microwave transmitter, and the directional coupler to transmit reflected microwave to the controller,
wherein the reflected microwave is not absorbed into the cavity and is inputted to the directional coupler through the microwave transmitter.

7. The cooking apparatus of claim 6, wherein the controller controls the microwave generator such that in a scan period among a cooking process using microwaves including the scan period and a heating period, microwaves of frequencies to be used during the heating period are selected.

8. The cooking apparatus of claim 6, wherein the controller controls the microwave generator such that when the microwaves having frequencies that a heating efficiency is equal to or greater than a threshold value, based on the microwaves reflected from inside of the cavity among the outputted microwaves, do not exist, the threshold value is adjusted down.

9. The cooking apparatus of claim 8, wherein the controller controls the microwave generator such that during a scan process for selecting the microwaves having frequencies to be used when heating, and a presence of the microwaves having frequencies that the heating efficiency is equal to or greater than the threshold value is identified.

10. The cooking apparatus of claim 8, wherein the controller controls the microwave generator such that when the threshold value is adjusted down, the microwaves having frequencies to be used when heating according to the downward adjusted threshold value are selected by re-performing the scan process.

11. A cooking apparatus using microwaves, comprising:
a microwave generator to sequentially generate and output a plurality of microwaves having different frequencies from each other;
a microwave transmitter to transmit the plurality of microwaves into a cavity; and
a controller to control the microwave generator such that a plurality of heating modes are selected according to a heating efficiency of each of the plurality of microwaves calculated based on the plurality of microwaves reflected from inside of the cavity among the outputted microwaves, and a same energy is supplied in each of the selected heating modes, wherein the controller is configured to control the microwave generator to output a part of the plurality of microwaves in a heating period based on the calculated heating efficiency, wherein the microwave generator includes:
- a frequency oscillator to oscillate to output microwaves of corresponding frequencies by a frequency control signal from the controller;
- a level controller to output microwaves as corresponding power by a power control signal from the controller;
- an amplifier to perform an amplifying operation to output predetermined frequency and power through the frequency oscillator and the level controller; and
- a directional coupler to transmit microwaves amplified and outputted from the amplifier to the microwave transmitter, and the directional coupler to transmit reflected microwave to the controller, wherein the reflected microwave is not absorbed into the cavity and is inputted to the directional coupler through the microwave transmitter.

12. The cooking apparatus of claim 11, wherein the controller controls the microwave generator such that the heating mode is selected based on a peak value of the calculated heating efficiency.

13. The cooking apparatus of claim 11, wherein the controller controls the microwave generator such that the heating mode is selected based on a predetermined threshold value for the calculated heating efficiency.

14. The cooking apparatus of claim 11, wherein the controller controls the microwave generator such that the same energy is supplied for each of microwaves having frequencies corresponding to a peak value of the calculated heating efficiency.

15. The cooking apparatus of claim 11, wherein the controller controls the microwave generator such that the total energy is equally supplied by each of the selected heating modes by supplying the heating energy to be inversely proportional to the frequency range for each of the selected heating modes.

16. The cooking apparatus of claim 11, wherein the microwave generator outputs a constant power for each of the microwaves corresponding to the selected modes during the heating period.

* * * * *